(12) United States Patent
Zeine

(10) Patent No.: US 10,523,301 B2
(45) Date of Patent: *Dec. 31, 2019

(54) METHOD AND APPARATUS FOR FOCUSED DATA COMMUNICATIONS

(71) Applicant: Ossia, Inc., Bellevue, WA (US)

(72) Inventor: Hatem I. Zeine, Bellevue, WA (US)

(73) Assignee: OSSIA INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,187

(22) Filed: Jul. 13, 2017

(65) Prior Publication Data

US 2017/0311288 A1   Oct. 26, 2017

Related U.S. Application Data

(63) Continuation of application No. 15/153,361, filed on May 12, 2016, now Pat. No. 9,736,815, which is a continuation of application No. 14/186,344, filed on Feb. 21, 2014, now Pat. No. 9,351,281.

(60) Provisional application No. 61/768,004, filed on Feb. 22, 2013.

(51) Int. Cl.
    *H04W 4/00*   (2018.01)
    *H04B 7/06*   (2006.01)
    *H04W 4/029*  (2018.01)

(52) U.S. Cl.
    CPC ........ *H04B 7/0695* (2013.01); *H04B 7/0617* (2013.01); *H04W 4/029* (2018.02)

(58) Field of Classification Search
    USPC .................. 370/295, 334, 335, 342, 441
    See application file for complete search history.

(56) References Cited

U.S. PATENT DOCUMENTS

| | | | |
|---|---|---|---|
| 3,314,067 A * | 4/1967 | Rutz | H01Q 3/42 342/352 |
| 6,167,272 A | 12/2000 | Hellstern | |
| 7,288,918 B2 | 10/2007 | DiStefano | |
| 8,032,134 B2 | 10/2011 | Tung | |
| 8,310,201 B1 | 11/2012 | Wright | |
| 9,351,281 B2 * | 5/2016 | Zeine | H04W 72/005 |
| 9,736,315 B2 * | 8/2017 | Pulhug | H04M 3/42382 |
| 2002/0085627 A1 | 7/2002 | Younis | |
| 2003/0117320 A1 | 6/2003 | Kim et al. | |
| 2004/0023649 A1 | 2/2004 | Bing et al. | |
| 2004/0203905 A1 | 10/2004 | Cuffaro | |
| 2007/0037528 A1 | 2/2007 | Doan et al. | |
| 2007/0140177 A1 | 6/2007 | Li et al. | |
| 2008/0214128 A1 | 9/2008 | Lim et al. | |
| 2008/0285631 A1 | 11/2008 | Shattil | |
| 2010/0112936 A1 | 5/2010 | Friman et al. | |
| 2011/0032149 A1 | 2/2011 | Leabman | |

(Continued)

FOREIGN PATENT DOCUMENTS

| | | |
|---|---|---|
| CN | 1545770 | 11/2004 |
| EP | 1922824 | 5/2008 |

(Continued)

*Primary Examiner* — Phuongchau Ba Nguyen
(74) *Attorney, Agent, or Firm* — Volpe and Koenig, P.C.

(57) ABSTRACT

A method and apparatus for focused communication is disclosed. The method includes a base transmitter array in communication with at least one client device at the same frequency. The base transmitter array provides a focused data communication to the client device.

12 Claims, 13 Drawing Sheets

(56) References Cited

U.S. PATENT DOCUMENTS

| | | |
|---|---|---|
| 2011/0250928 A1 | 10/2011 | Schlub et al. |
| 2012/0142280 A1 | 6/2012 | Banu et al. |
| 2012/0281783 A1 | 11/2012 | Cheng et al. |
| 2013/0039342 A1 | 2/2013 | Kazmi |
| 2014/0078973 A1 | 3/2014 | Kazmi et al. |
| 2014/0114635 A1* | 4/2014 | Sato ............... H04W 16/18 703/13 |
| 2014/0192915 A1 | 7/2014 | Mundarath et al. |

FOREIGN PATENT DOCUMENTS

| | | | |
|---|---|---|---|
| EP | 1992077 | 11/2008 | |
| EP | 2269408 | 1/2011 | |
| JP | 06-303172 | 10/1994 | |
| JP | 10-070502 | 3/1998 | |
| JP | 2005-140639 | 6/2005 | |
| JP | 2005-159504 | 6/2005 | |
| JP | 2006166321 A2 | 6/2006 | |
| JP | 2006246633 | 9/2006 | |
| JP | 2013-047942 | 3/2013 | |
| KR | 20090110593 A | 10/2009 | |
| WO | 2007021891 A1 | 2/2007 | |
| WO | 2007084717 A2 | 7/2007 | |
| WO | 2009111597 A2 | 9/2009 | |
| WO | WO 2012/172670 A1 * | 12/2012 | ............. H04B 17/00 |
| WO | WO13006462 A1 | 1/2013 | |

* cited by examiner

US 10,523,301 B2

METHOD AND APPARATUS FOR FOCUSED DATA COMMUNICATIONS

CROSS REFERENCE TO RELATED APPLICATIONS

This application is a continuation of U.S. application Ser. No. 15/153,361, filed May 12, 2016, which is a continuation of U.S. application Ser. No. 14/186,344 filed Feb. 21, 2014, which issued as U.S. Pat. No. 9,351,281 on May 24, 2016, which claims the benefit of U.S. Provisional Patent Application No. 61/768,004, filed Feb. 22, 2013, all of which the contents are incorporated herein by reference as if fully set forth.

FIELD OF INVENTION

The present invention relates generally to data communications.

BACKGROUND

As the world becomes more and more dependent on access to data from mobile devices, there is an increasing need to provide data services to clients requesting them. Cellular systems, global positioning systems (GPS) and wireless communication systems, (e.g., IEEE 802 systems), are faced with limitations regarding, for example, bandwidth, range, and capacity. Some solutions to this are to add infrastructure and/or to utilize pointed range techniques. However, these methods can be costly and ineffective.

Thus, a method and apparatus for focusing data communications is desired.

SUMMARY

A method and apparatus for focused communication is disclosed. The method includes a base transmitter array in communication with at least one client device. The base transmitter array provides a focused data communication to the client device.

These and other features of the invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION

Figure 1:
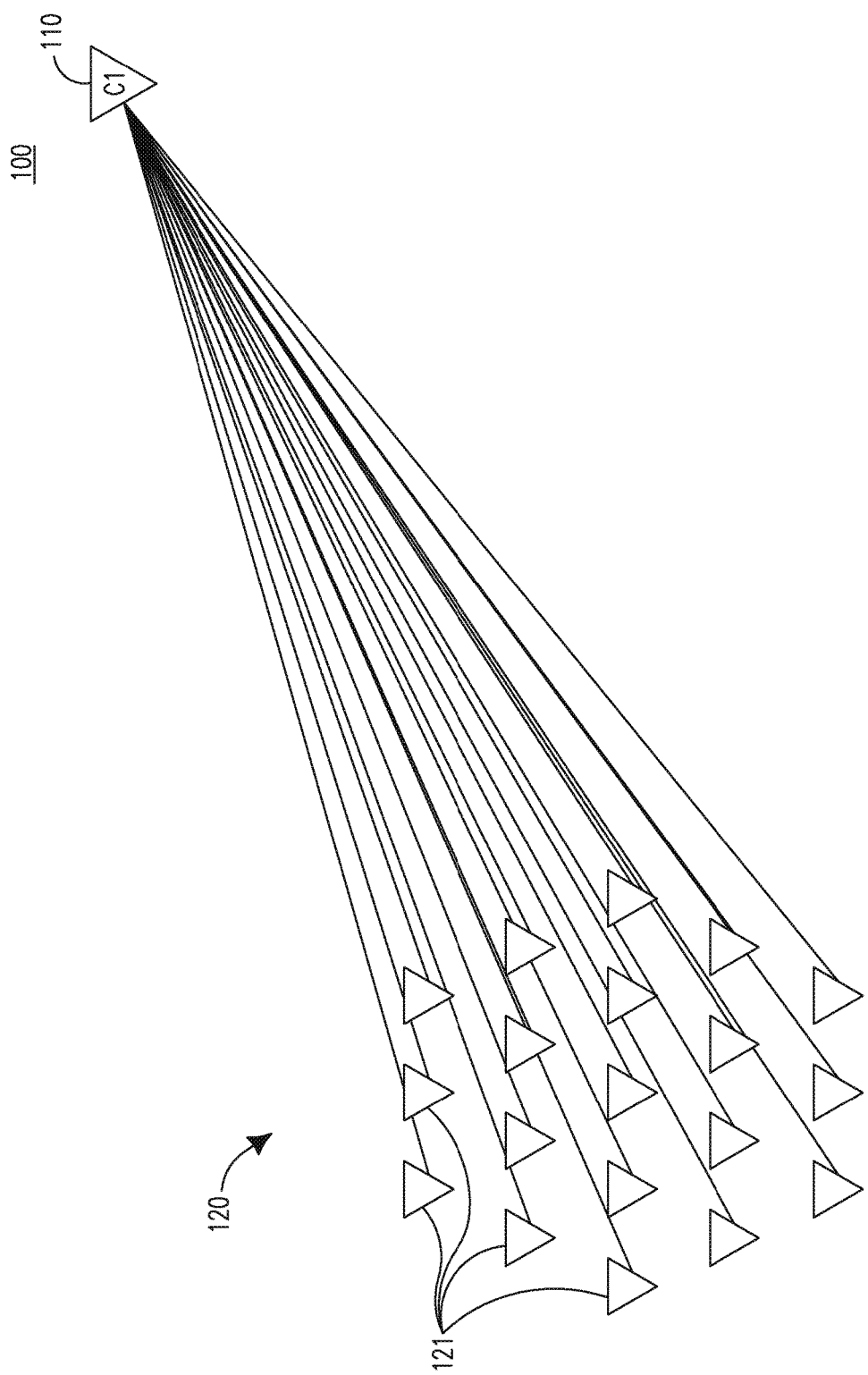
FIG. 1 is an example system diagram of a focused data communications system including a client device and a base transmitter array.

FIG. 1 is an example system diagram of a focused data communications system 100 including a client device 110 and a base transmitter array 120. The base transmitter array 120 includes a plurality of antennas 121. It should be noted that, although nineteen antennas 121 are depicted in the example base transmitter array 120, any number of antennas may be utilized. The client 110, (denoted C1), is in wireless communication with the antennas 121 of the base transmitter array 120. Each antenna 121 receives the communication from the client device 110 at a different time offset and transmits data to the client device 110 utilizing the time offset in the reverse order to the transmission time offset received from the client device 110 such that when the data transmission signals from each antenna 121 are summed at the client device 110, a clear signal is received. For example, the path length per antenna 121 may be p(n). The time of the path then may be given by the equation:

$$t(n)=p(n)/c, \qquad \text{Equation (1)}$$

where c=the speed of light.

In order for the data transmission signals from each antenna element 121 to arrive at the client device 110 at the same time, each antenna element 121 starts its transmission at:

$$\text{time}=\max(t(n))-t(n). \qquad \text{Equation (2)}$$

Figure 2:
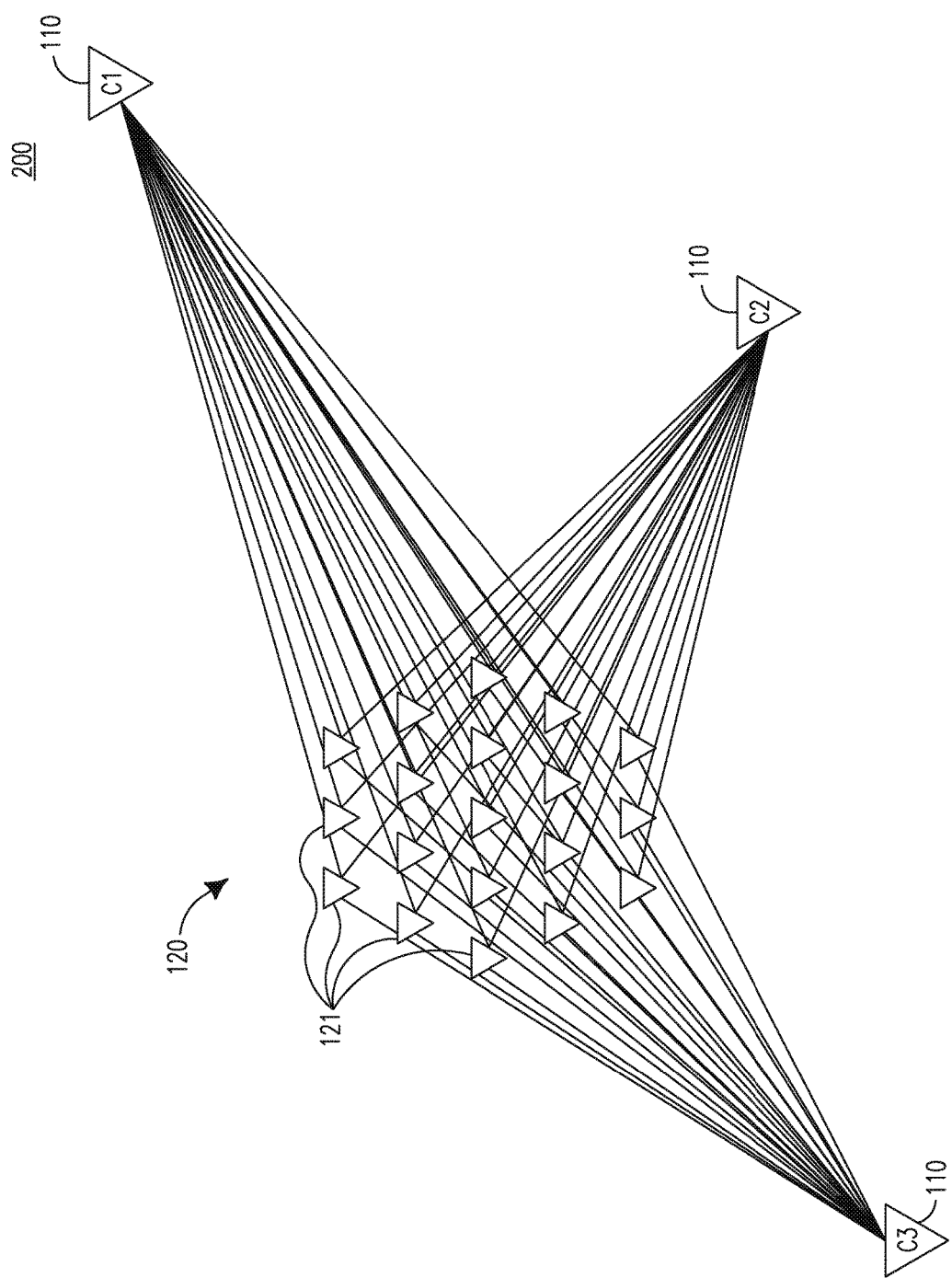
FIG. 2 is another example system diagram of a focused data communications system including a plurality of client devices.

FIG. 2 is another example system diagram of a focused data communications system 200 including a plurality of client devices 110. In system 200, each client device 110, (denoted C1, C2, and C3), is in wireless communication with each antenna element 121 of the base transmitter 120. In this case, multiple communication links are created between the base transmitter 120 and each client device 110.

Since each signal to client C1, C2, and C3 is separated, the client devices 110 may share the same frequency or channel, thus allowing an increase in the utilization of each frequency band or communication channel. Additionally, the signal of each client device 110 should be below, or much lower than, the noise level of the signal intended to another client device 110. For example, signals not intended for C1 cancel one another, resulting in a clear transmission of the signal intended for C1 at client device C1.

In order to transmit simultaneous signals to multiple clients 110 on the same frequency, each antenna element 121 utilizes the time offset received from each client 110 relative to every other antenna element 121 in the base transmitter array 120. Accordingly, each antenna element 121 may then sum the encoded signals and transmit a juxtaposed sum of all the client 110 signals to the clients 110, resulting in separate spatially isolated data communication signals that the intended client 110 may receive and decode clearly. For example, at an intended focus location, the signals (each having a strength "s"), add up linearly, causing a linear increase in the client device's 110 antenna, whereby the total signal is N times s. However, at non-intended focus locations, the signals are received at haphazard times without a cohesive phase, resulting in a signal that has a strength of: $(s0+s1+s2+s3+s4+s5+s6+ \ldots +sN)/N$, which is much weaker than the intended focus signal Also, since the same, or a single, frequency may be shared and utilized to transmit data from the base transmitter array 120 to multiple clients 110, it is therefore possible to expand the capacity of the data communication systems, (e.g., 100, 200 and 300). For example, by utilizing multiple frequencies, where groups of client devices 110 share a first frequency, groups of client devices 110 share a second frequency, and so on, many more client devices 110 may be provided services by the base transmitter array 120.

Figure 3:
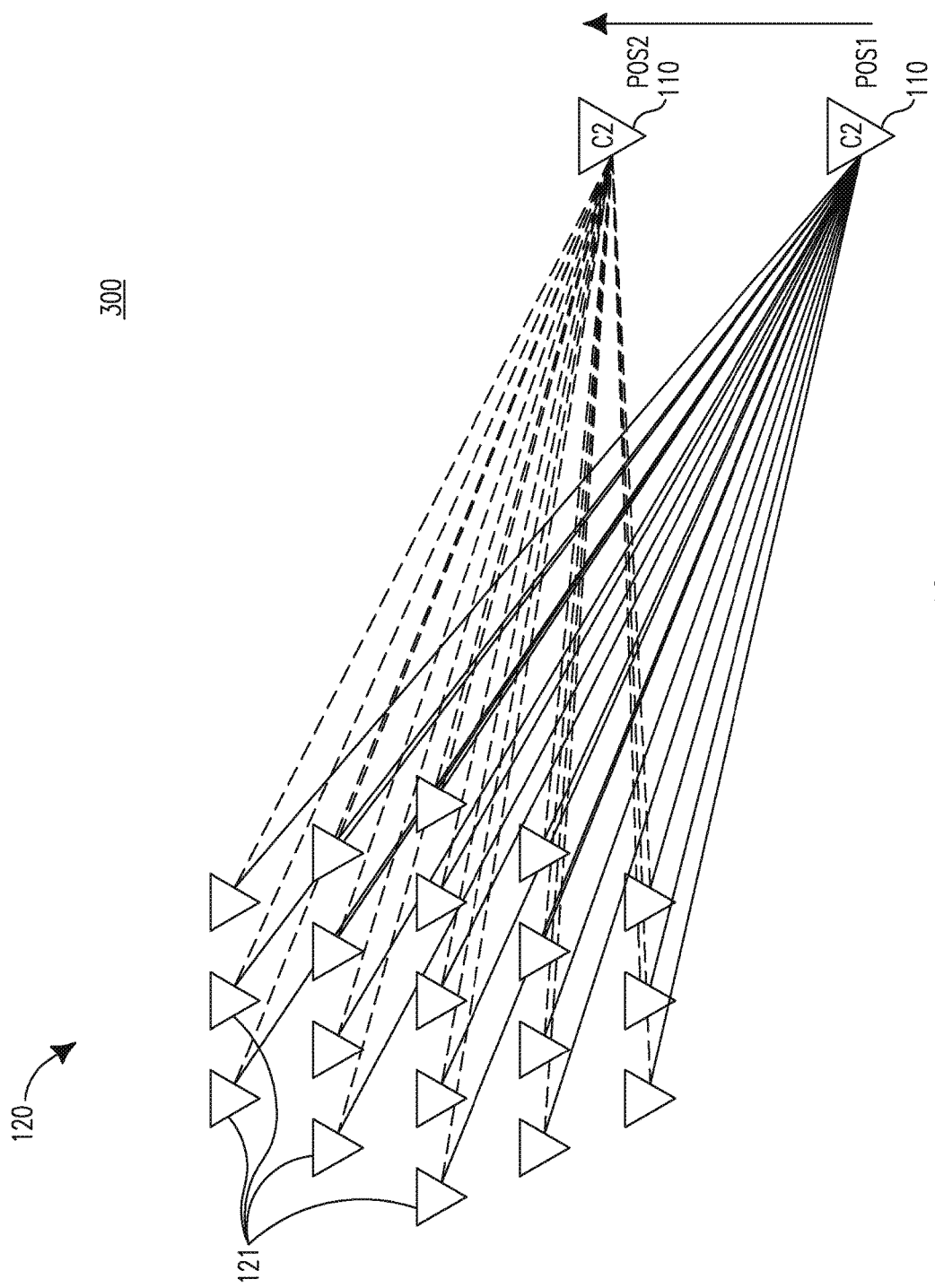
FIG. 3 is another example system diagram of a focused data communications system including a moving client device.

FIG. 3 is another example system diagram of a focused data communications system 300 including a moving client device 110, denoted as C2. In this scenario, the client device C2 is moving from a first position (POS1) to a second position (POS2) in the direction of the arrow, while maintaining wireless communication with each of the antenna elements 121 of the base transmitter array 120. Each antenna element 121 is recalibrated during every signal reception to account for the change in time offset received from client device C2.

Figure 4:
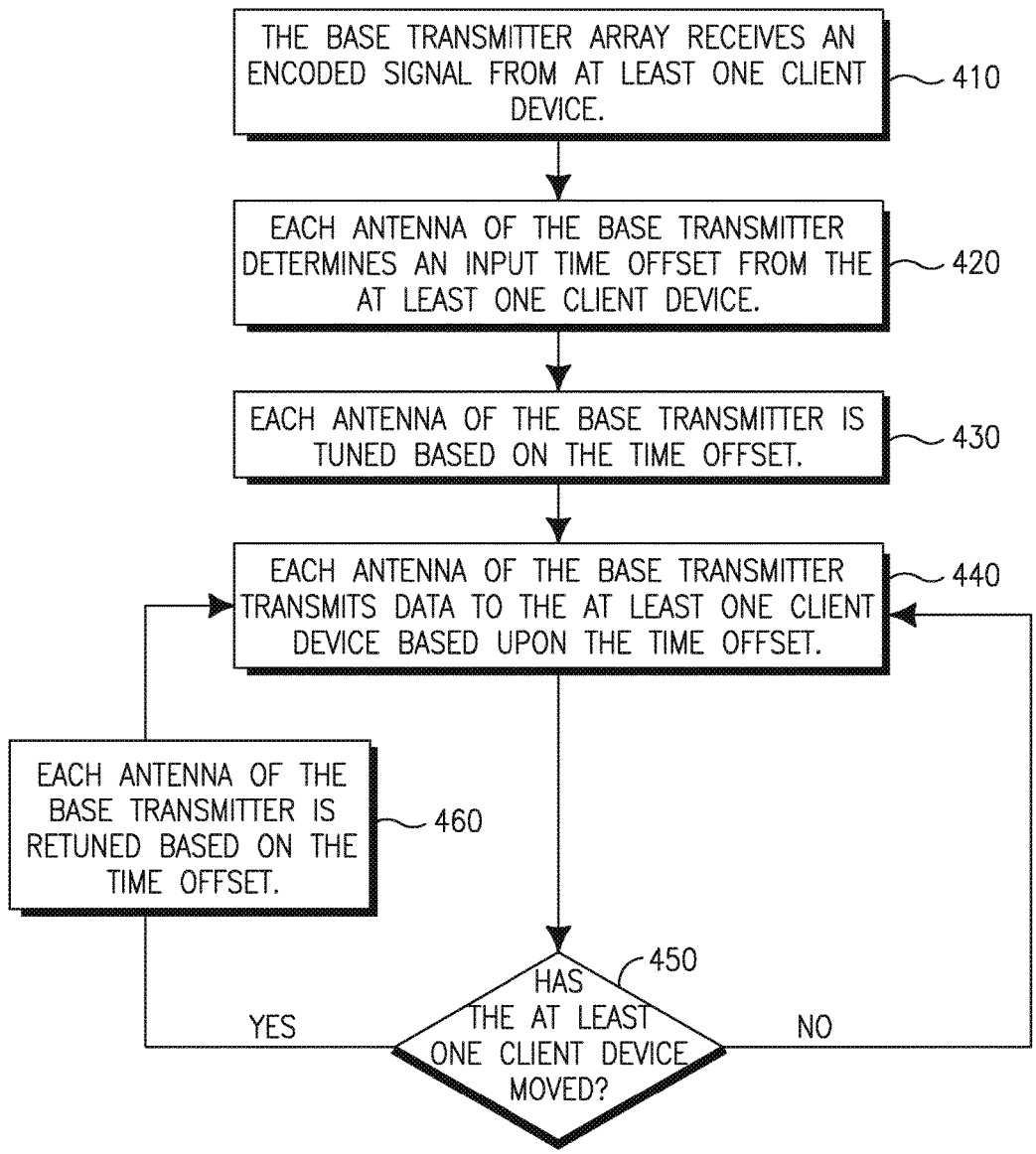
FIG. 4 is a flow diagram of an example method of providing focused data communications.

FIG. 4 is a flow diagram of an example method 400 of providing focused data communications. For purposes of example, method 400 may be applied to any of the above described systems 100, 200, and 300, as well as any other data communications system. In step 410, the base transmitter array 120 receives an encoded signal from at least one client device 110. For example, in the system depicted in FIG. 1, the base transmitter array 120 receives a communication signal from client device C1. In FIG. 2, the base transmitter array 120 receives multiple communication signals from client devices C1, C2, and C3. In FIG. 3, the base transmitter array 120 is shown receiving a communication signal from client device C2.

Each antenna element 121 of the base transmitter array 120 receives the data communications from the at least one client device 110 with a different time offset than every other antenna element 121. For example, referring back to FIG. 1, antenna element $121_1$ receives the data communication from client device C1 with a different offset than antenna element $121_n$. Accordingly, each antenna element 121 of the base transmitter 120 determines an input time offset from the at least one client device 110 (step 420) with respect to every other antenna element 121.

The offset determination may be performed by summing of the totality of the antennas of the antenna elements 121. In this manner, each antenna element 121 is comparing itself to the consensus, and when an antenna is getting away from the consensus, it starts to get back in line with a new offset, which it discovers by testing its output against the consensus, or testing its modified time offset consensus against the consensus without the modification, and choosing whether to keep the modification or stay the same. This may be performed by the antenna elements 121 whether the client device 110 is in motion or not.

Once the time offset is computed, each antenna element 121 of the base transmitter 120 is tuned based on the time offset for each client device 110 (step 430). For example, each antenna element 121 may time offset its transmission signal to the client device 110 in the reverse order of the received time offset from the client device 110.

In step 440, each antenna element 121 of the base transmitter 120 transmits data to the at least one client device 110 based upon the determined time offset at that antenna element.

Since the client devices 110 may be in motion, a determination is made as to whether the at least one client device 110 has moved (step 450). For example, in FIG. 3, client C2 is shown moving from POS1 to POS2. In this case, each antenna element 121 is recalibrated and retuned (step 460) to account for the movement of the client device 110. This may be accomplished by comparing each antenna element's time shifted signal against a consolidated signal, whereby if the time shifted signal is not in synch with the consolidated signal, it is adjusted to match the consolidated signal, and is communicated to each antenna element 121 to update a table entry with respect to that client device 110.

Figure 5:
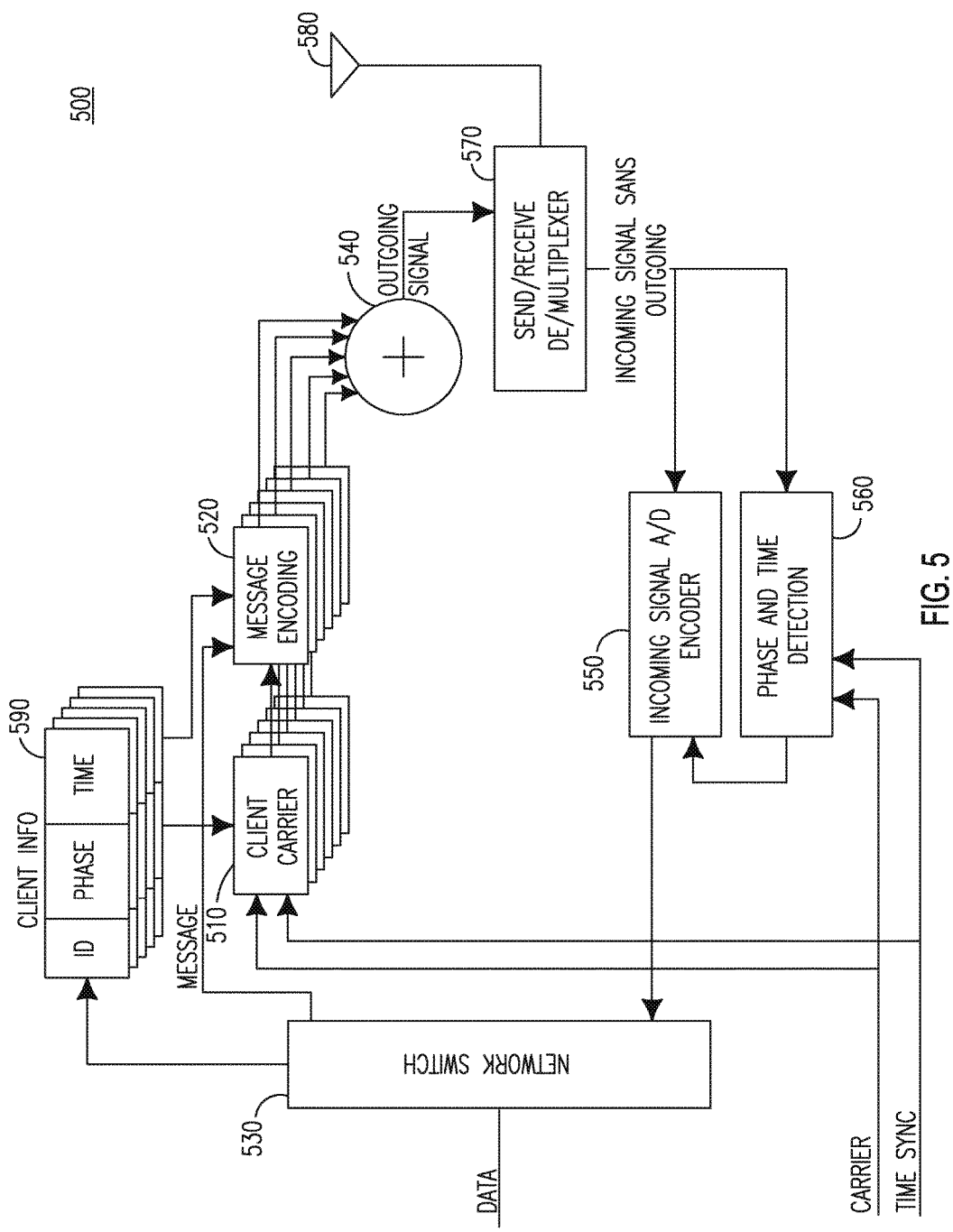
FIG. 5 is an example functional block diagram of an antenna element processor in accordance with an embodiment.

FIG. 5 is an example functional block diagram of an antenna element processor 500 in accordance with an embodiment. The antenna element processor 500 includes a plurality of client carrier components 510, a plurality of message encoding components 520, a network switch 530, a summer 540, an incoming signal analog to digital (A/D) encoder 550, a phase and time detection component 560, a send/receive multiplexer/demultiplexer (MUX/DEMUX) 570, and an antenna 580. Client information for each client device 110, (e.g., client ID, phase position, and time offset), is stored in a table 590 utilized by the antenna element processor 500.

Data enters on an input line to the network switch 530, while carrier and time synch information are input into the client carrier component 510 and phase and time detection component 560. The carrier information may be common signal carrier information shared with all antenna elements 121, such as a lower frequency for use by a phase locked loop (PLL) to target the frequency of any desired channel. The time synch signal may be a clock that allows resolution of events to a sub-wave level, (e.g., 10 ns for a 2.4 GHz signal, or 4 ns for a 900 MHz signal).

The network switch 530 outputs a message signal to the message encoding components 520, which also receive inputs from respective client carrier components 510. The network switch 530 also provides the client information table 590 information to the client carrier components 510 and message encoding components 520. The summer 540 receives the signals from the message encoding components 520 along with the appropriate time offset for each client device 110 and outputs an outgoing signal to the MUX/DEMUX 570 for transmission by the antenna 580. If the input received by the summer 540 is a digital signal, the summer may be a digital signal adder and convert the summation to analogue, while if the input to the summer 540 is an analog signal, the summer 540 performs the summation in the analog domain.

The MUX/DEMUX 570 also receives incoming transmissions from the antenna 580 and forwards the incoming signal sans the outgoing signal, to the incoming signal A/D encoder 550 and phase and time detection component 560. The MUX/DEMUX 570 may be utilized to operate to allow multiple client devices 110 to transmit to the antenna element 121, while transmitting data from the antenna element 121 to other client devices 110.

The incoming signal A/D encoder 550 outputs a digital signal to the network switch 530, and the phase and time detection component outputs a signal to the incoming signal A/D encoder 550. The phase and time detection component 560 may detect or establish new client devices 110, for example utilizing an encoded beacon signal from a client device 110.

Figure 6:
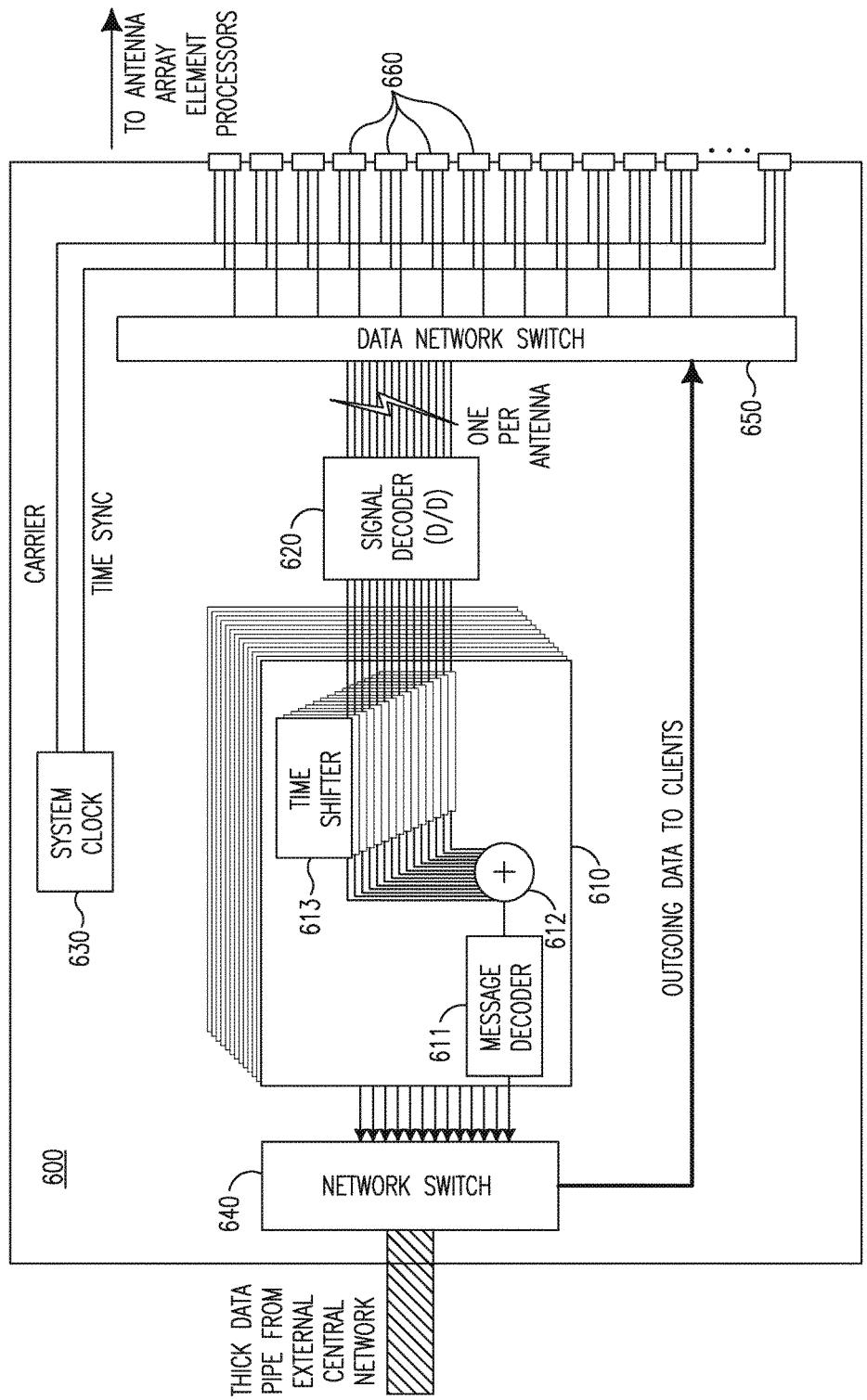
FIG. 6 is an example functional block diagram of an array controller in accordance with an embodiment.

FIG. 6 is an example functional block diagram of an array controller 600 in accordance with an embodiment. The array controller 600 may be utilized to coordinate the functioning of all of the antenna elements 121. The array controller 600 includes a plurality of conceptual components 610, a digital to digital signal decoder (D/D) 620, a system clock 630, a network switch 640, a data network switch 650, and a plurality of connectors 660.

In operation, where each antenna element 121 has established its phase and time offsets necessary to send out a signal, each data packet for transmission is tagged with the client identification so that it may be encoded with the appropriate phase and time offsets.

The array controller 600 receives signals from a client device 110 in the conceptual component 610 for a particular client device 110. This signal may be received indirectly via the A/D encoder 550 of each antenna element processor 500. The signal from each antenna element 121 may then be added to the signals from all other antenna elements 121 utilizing "reverse timing" of the client device 110 time offset used to transmit. The reverse timing may be computed in accordance with the following equation:

$$\text{Reverse Timing} = (\text{MaxClientTimeOffset}) - \text{ClientTimeOffset}, \quad \text{Equation (3)}$$

where the reverse timing is effectively a number between 0 and the ClientTimeOffset for each client, and MaxTimeOffset is the difference in time from the earliest antenna element 121 receiving a signal to the latest antenna element 121 receiving the same signal.

Since each client device 110 is silent for some of the time, there may be little crosstalk between signals and the data lines may be silent. Where more than one client device 110 is in the same location for the most part, (e.g., "hot spot"), where the time offsets are so similar to one another that their signals are received superimposed, it may be difficult to differentiate between one client device 110 and another. In these cases, time division multiple access (TDMA) and/or code division multiple access (CDMA) transmission techniques may be utilized. A client device 110 may also deactivate collision detection mechanisms in order to transmit to the base transmitter 120 without waiting for other client devices 110 to cease their transmissions, in order to enable full two-way bandwidth capabilities with each client device 110.

The network switch 640 receives data, (e.g., data packets from/to client devices 110), from a thick data pipe from an external central network and communicates data back and forth to each conceptual component 610, which includes a message decoder 611, a summer 612 and a plurality of time shifters 613. Data proceeds to the antenna elements 121 from the conceptual components 610 via the D/D 620, data network switch 650 and the connector 660 for a respective antenna element 121. Additionally, the system clock 630 provides the carrier and time synch signals for each antenna element 121. Outgoing data to clients is provided by the network switch 640 to the data network switch 650.

Figure 7:
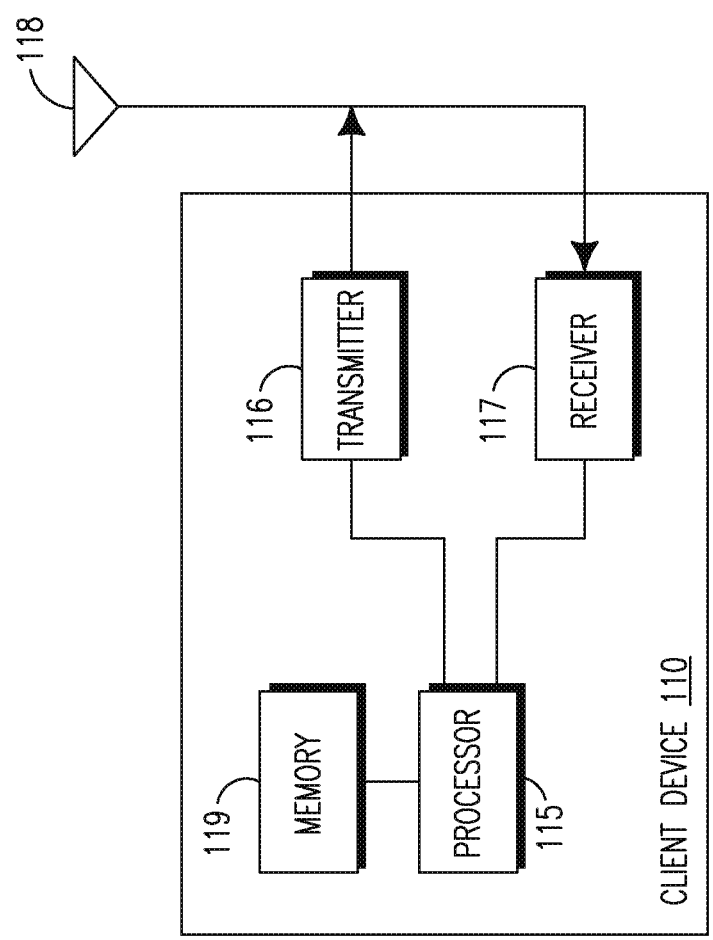
FIG. 7 is an example functional block diagram of a client device in accordance with an embodiment.

FIG. 7 is an example functional block diagram of an example client device 110 in accordance with an embodiment. The client device 110 includes a processor 115, a transmitter 116 in communication with the processor 115, a receiver 117 in communication with the processor 115, an antenna 118 in communication with the transmitter 116 and the receiver 117, and a memory 119 in communication with the processor 115 in order to facilitate wireless transmission and reception. The processor 115 may be configured to process data communications for transmission and reception to and from the base transmitter array 120.

FIGS. 8A-8F are example system diagrams of a focused data communications base transmitter array 820 during detection of a new client device 110. For purposes of example, the base transmitter array 820 is substantially similar to the base transmitter array 120, and although nineteen antenna elements 821 are shown, it should be understood that more or less antenna elements may be utilized. Additionally, it should be noted that antenna elements 821 are substantially similar to antenna elements 121.

Figure 8A:
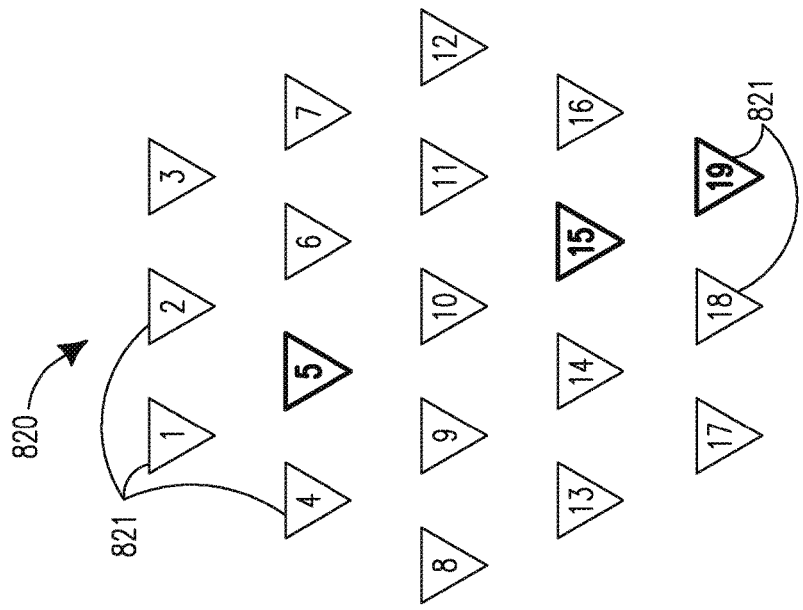
FIGS. 8A-8F are example system diagrams of a focused data communications base transmitter array during detection of a new client device.
Figure 8B:
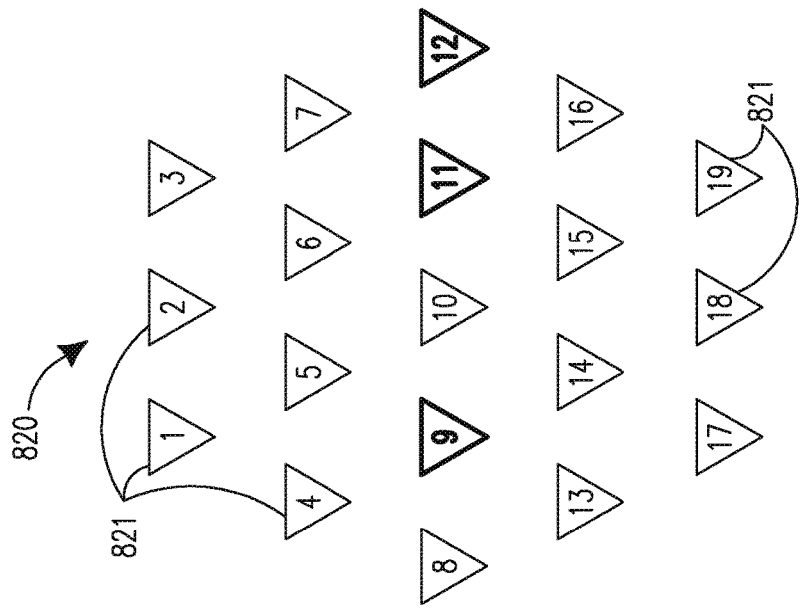
Figure 8D:
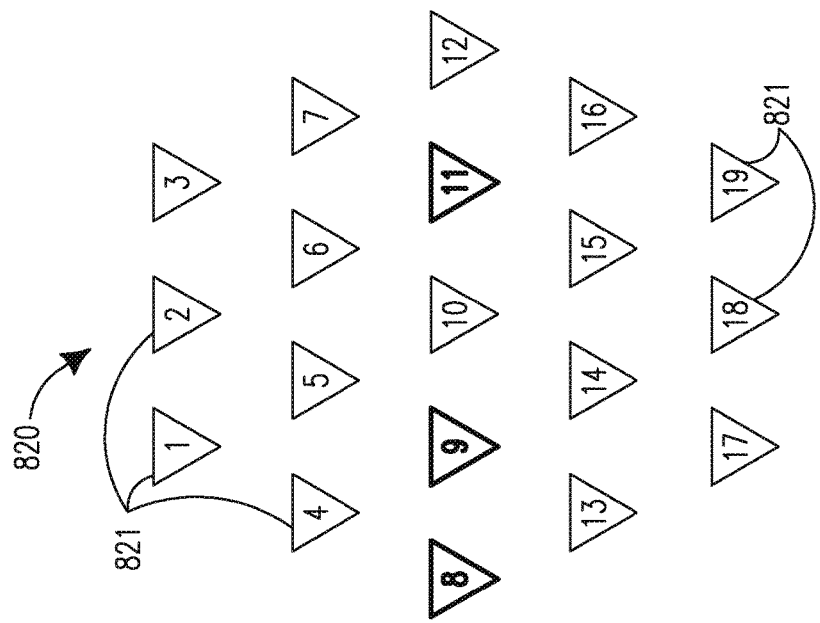
Figure 8C:
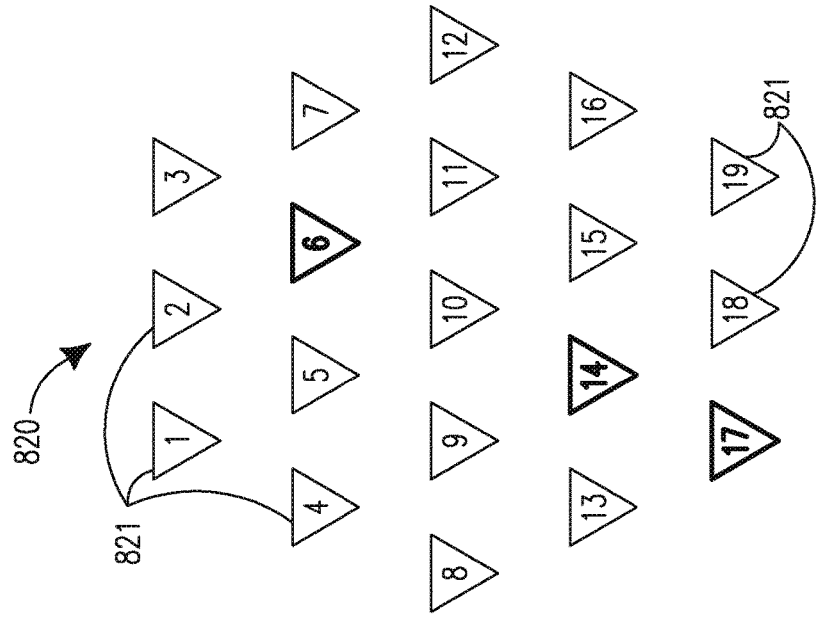
Figure 8F:
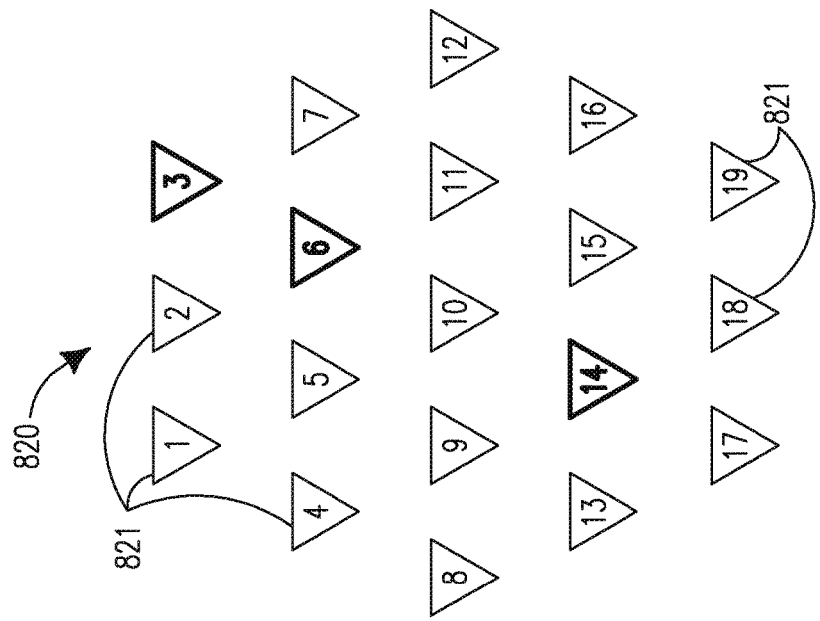
Figure 8E:
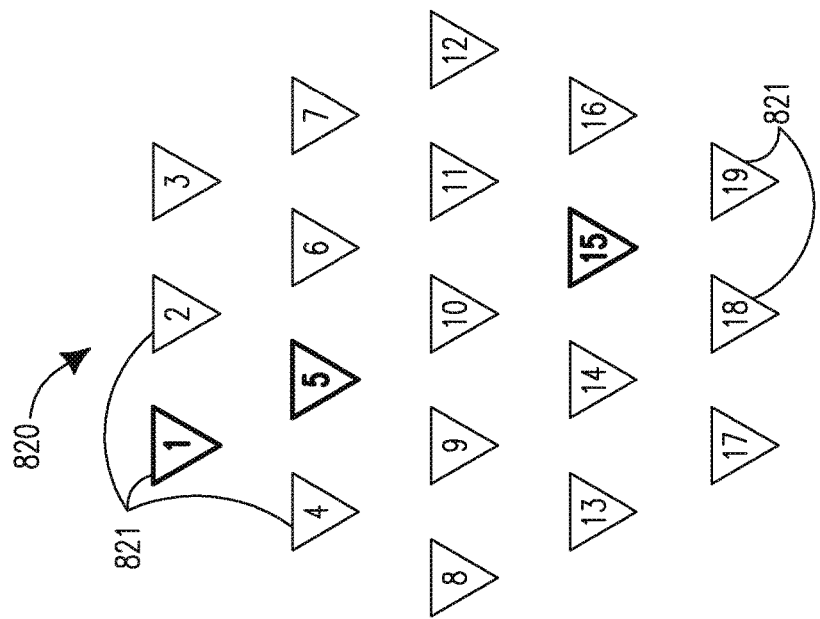

When the base transmitter array 821 is operational, it may detect new clients within its service domain and establish time offsets for communication. When a client device 110 is powered on, it attempts to communicate with the base transmitter array 820. Accordingly, the base transmitter array 820 may tune specific antenna elements 821 to specific directions. For example, in FIG. 8A, antenna elements 9, 11 and 12 are tuned to a first direction. In FIG. 8B, antenna elements 5, 15, and 19 are tuned to a second direction. In FIG. 8C, antenna elements 6, 14, and 17 are tuned to a third direction. In FIG. 8D, antenna elements 8, 9, and 11 are tuned to a fourth direction. In FIG. 8E, antenna elements 1, 5, and 15 are tuned to a fifth direction. In FIG. 8F, antenna elements 3, 6, and 14 are tuned to a sixth direction. The tuning may be accomplished in a soft manner, such as by dedicated circuitry such as the conceptual component 610 describe above.

In the layout shown in FIGS. 8A-8F, each reception lobe of the base transmitter array 820 may have a width of 75 degrees, allowing overlap and full coverage around the array. However, it should be noted that any subdivision of 360 degrees may be utilized to form the reception lobes that make up the set of tuned directions.

Figure 9:
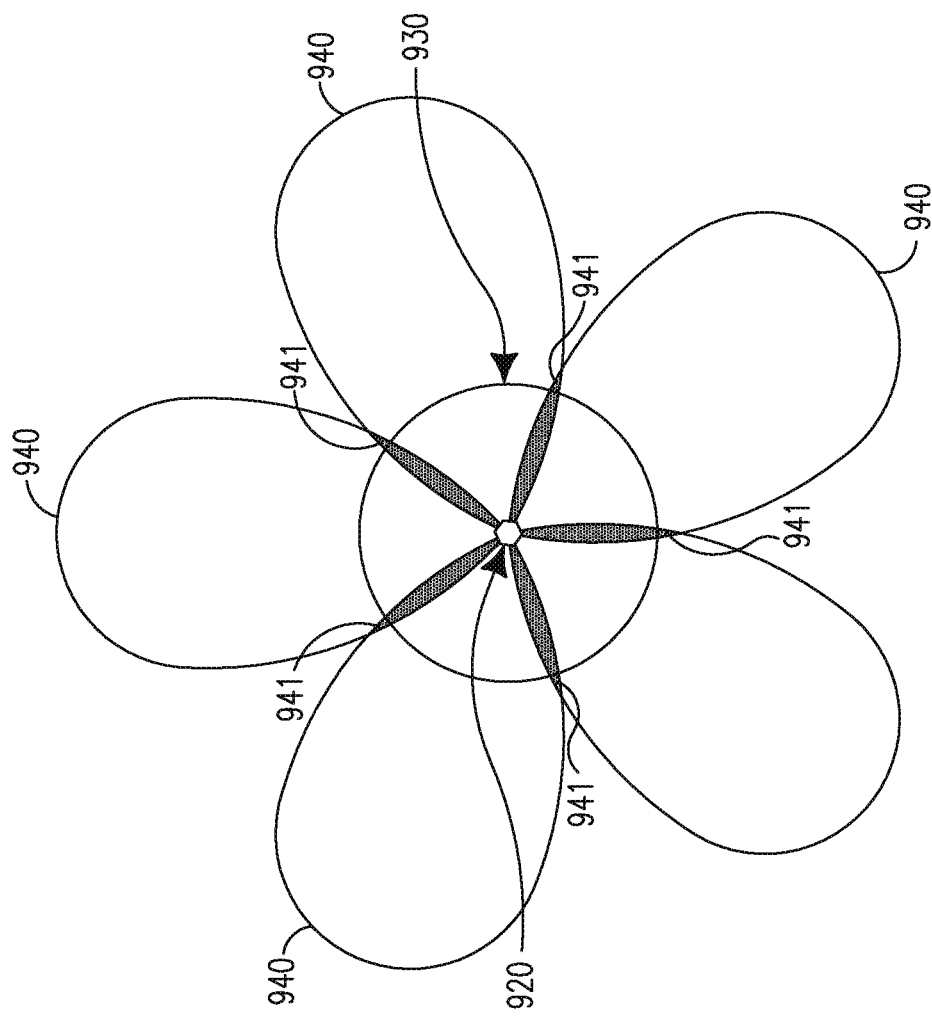
FIG. 9 shows an example array coverage of a focused data communications system.

FIG. 9 shows an example array coverage of a focused data communications system 900 tuned in accordance with the antenna elements 821 in FIGS. 8A-8F. The base transmitter array 920, which is substantially similar to the base transmitter arrays 120 and 820, includes a coverage area 930. A plurality of coverage lobes 940 include a plurality of overlap areas 941. Accordingly, a new client device 110 within the coverage area 930 is detected by the base transmitter array 920.

Since the directional lobes are monitoring for new client devices 110 not yet known, once a new client device 110 is detected, the remainder of the antenna elements 821 may be provided with information to quickly correct their respective time and phase offsets so that the newly detected client devices 110 receive their focused spatially directed data signal.

Due to the signals being highly focused, battery life of the client device 110 may be increased as the client device 110 may utilize less power for communication with the base transmitter array 120/420/820/920. Additionally, the coverage area 930 may be greater than in a conventional communication system for the same power, since focused signals may travel farther, and since the array is able to tune to a particular client device 110, as opposed to sending signal power out in multiple directions.

Figure 10A:
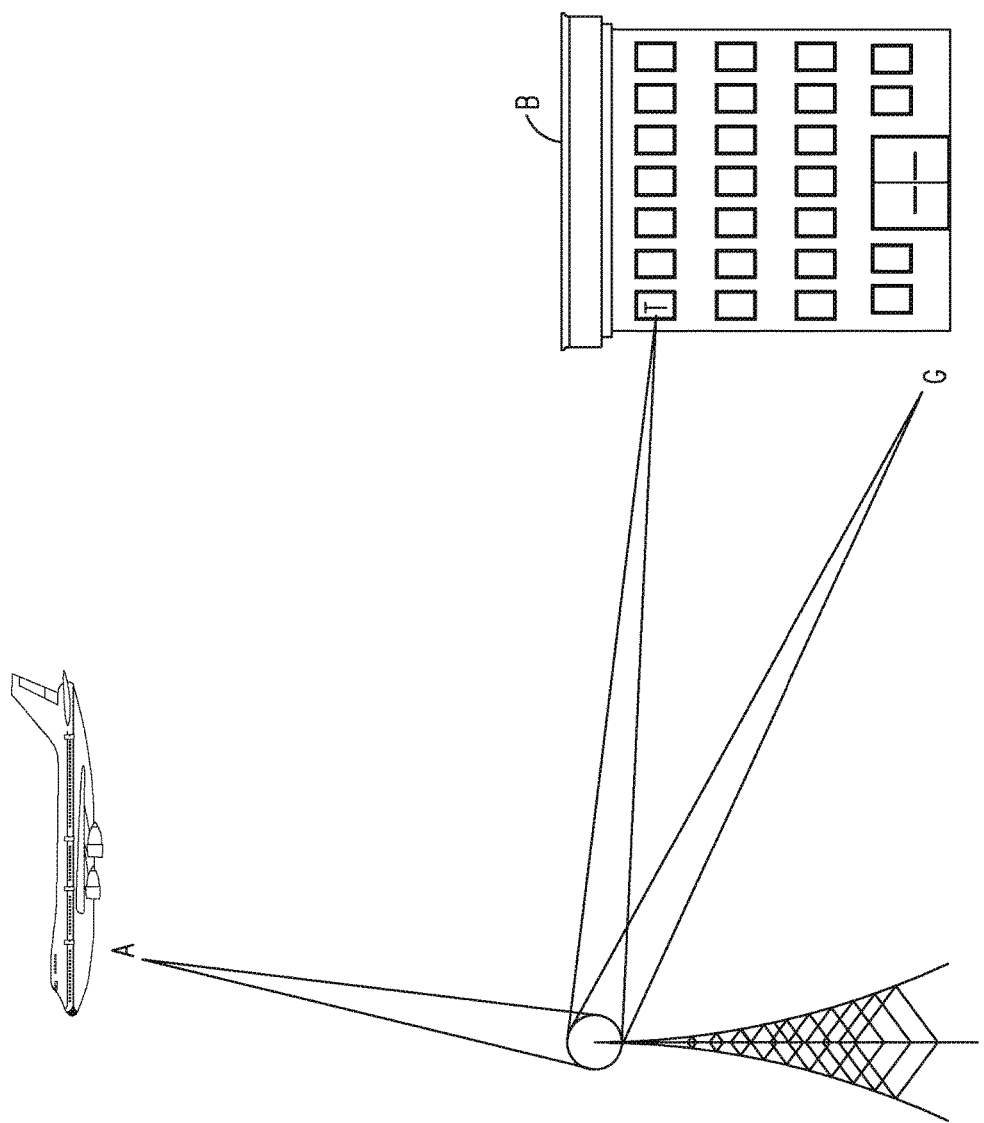
FIGS. 10A-10C are example diagrams of directivity and location embodiments of a focused communications system.
Figure 10B:
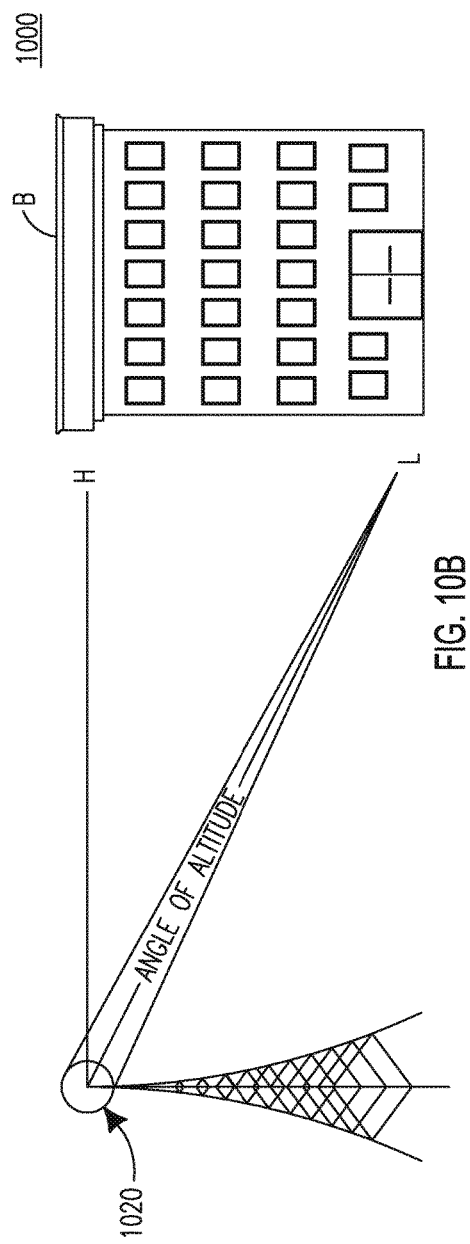
Figure 10C:
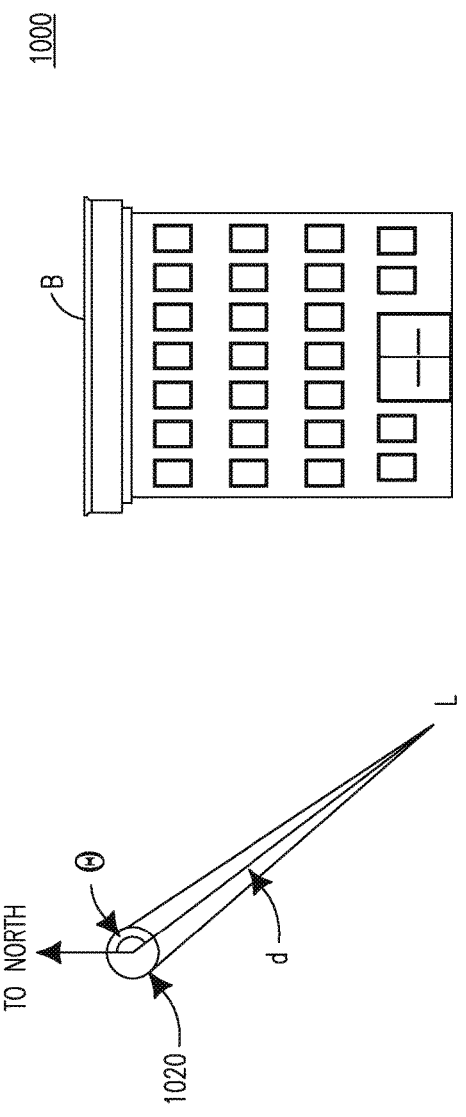

FIGS. 10A-10C are example diagrams of directivity and location embodiments of a focused communications system 1000. For example, in FIG. 10A, the system includes a base transmitter array 1020, which is substantially similar to the base transmitter arrays 120, 420, 820 and 920. As conventional data communication arrays include antennas directed generally downward, only a client device 110 at ground level G may experience quality data communications. Accordingly, a client device 110 at position T at the top floor of a tall building B, or a client device 110 on an airplane A, may not receive quality data communications.

By utilizing a focused data communication system, such as using the base transmitter 1020, (shown on a conventional cellular tower), high quality signals may be provided to client devices 110 at locations G, B, or A.

FIGS. 10B and 10C depict the focused data communication system 1000 in an embodiment that may be utilized for location based services, similar to GPS or navigation services. In the example shown in FIGS. 10B and 10C, a client device 110 at location L, shown adjacent to building B, may be located using the base transmitter array 1020. By analyzing the time offsets at each antenna element (not shown) of the base transmitter array 1020, it can be determined the angle of altitude of location L with respect to the height H of the base transmitter array 1020. Similarly, an azimuth angle θ can be determined by knowledge of the direction of the location L with respect to North in relation to the base transmitter array 1020. Additionally, since the distance d may be determined by the configuration of the base transmitter array 1020, location services may be provided to the client device 110 at location L. Effectively, by examining the time delays at the base transmitter array 1020, the direction of the client may be determined. However, since the base transmitter array 1020 has volumetric size, multiple determined directions may be traced from the edges of the volume to determine where they converge at, which may provide the actual location (direction+distance).

The methods and devices described above may operate at the physical communication layer stack. However, it should be noted that any stack may be utilized to carry out functionality as needed for any of the methods and devices described above.

It is to be understood that the present invention is not limited to the embodiments described above, but encompasses any and all embodiments within the scope of the following claims. For example, the client device described above may refer to a cellular phone, PDA, or any other wireless device that may be utilized for data communication. Additionally, for example, the size of the base transmitter array may be on the order of the (number of clients)$^{2.5}$, however any size may be utilized. Additionally, although the client device 110 is shown, for purposes of example, as having only a single antenna, it should be noted that client devices may include more than one antenna.

Also, it should be noted that the base transmitter array may be a large set of antennas configured in a three-dimensional (3D) arrangement, where each antenna is capable transmitting one or more data encoded signals, whereby the transmitted signal is the sum of the encoded signals to be transmitted. As described above, each signal may be added with a specific time offset that is different for each antenna element. One example arrangement to arrange the antenna elements of the base transmitter array is to utilize the example of 3D quasi-crystal arrangement.

Additionally, although the features and elements of the present application are described in the example embodiments in particular combinations, each feature or element can be used alone (without the other features and elements of the example embodiments) or in various combinations with or without other features and elements of the present application.

The invention claimed is:

1. A wireless communication system comprising:
    a plurality of antenna elements that receive electromagnetic radiation, wherein the plurality includes a first antenna element and a second antenna element; and
    an array controller that is communicatively coupled to the plurality of antenna elements;
    wherein the array controller:
        receives, using the plurality of antenna elements, a first signal from one or more first new client devices,
        calculates a reverse timing for each of the plurality of antenna elements based on a difference between a time when the first signal is received by the first antenna element and the second antenna element,
        determines a first location of the one or more first new client devices in three-dimensional space based on the reverse timing,
        tunes the plurality of antenna elements to generate constructive interference of an electromagnetic wave at the first location; and
        transmits, using the plurality of antenna elements, the electromagnetic wave to the one or more first devices.

2. The wireless communication system of claim 1, wherein the reverse timing for each of the plurality of antennae elements is further calculated by:
    recording a respective input time offset of the first signal for each respective antennae element; and
    calculating the reverse timing for each of the plurality of antennae elements based on the respective input time offset.

3. The wireless communication system of claim 1, wherein the the array controller further:
    receives, using the plurality of antenna elements, a second signal from one or more second new client devices;
    determines a second location of the one or more first new client devices in three-dimensional space based on a reverse timing of the second signal; and
    generates, using the plurality of antenna elements, constructive interference of an electromagnetic wave at the second location.

4. The wireless communication system of claim 3, wherein the array controller further:
    transmits, using the plurality of antenna elements, the electromagnetic wave at a first frequency to the one or more first client devices and a second frequency to the one or more second client devices.

5. The wireless communication system of claim 1, wherein the array controller further:
    demuxes the first signal into multiple data signals, each corresponding to one of the first client devices;
    prepares responsive data signals for each of the first client devices;
    generates an output data signal by muxing the responsive data signals; and
    transmits, using the plurality of antenna elements, the output data signal to the first client devices.

6. The wireless communication system of claim 1, wherein the first location includes a height component.

7. The wireless communication system of claim 1, wherein the array controller further:
    determines a motion vector for the one or more first new client devices based upon the first location.

8. A wireless communication method comprising:
    receiving, by an array controller, a first signal from one or more first new client devices using a plurality of antenna elements that includes a first antenna element and a second antenna element,
    calculating, by the array controller, a reverse timing for reach of the plurality of antenna elements based on a difference between a time when the first signal is received by the first antenna element and the second antenna element, determining, by the array controller, a first location of the one or more first new client devices in three-dimensional space based on the reverse timing, tuning, by the array controller, the plurality of antenna elements to generate constructive interference of an electromagnetic wave at the first location; and transmitting, by the array controller, the electromagnetic wave to the one or more first devices via the plurality of antenna elements.

9. The wireless communication method of claim 8, wherein the reverse timing for each of the plurality of antennae elements is further calculated by:

recording a respective input time offset of the first signal for each respective antennae element; and calculating the reverse timing for each of the plurality of antennae elements based on the respective input time offset.

10. The wireless communication method of claim 8 further comprising:

receiving, by the array controller, a second message from one or more second new client devices via the plurality of antenna elements;

determining, by the array controller, a second location of the one or more first new client devices in three-dimensional space based on the second message; and generating, by the array controller, constructive interference of an electromagnetic wave at the second location using the plurality of antenna elements.

11. The wireless communication system of claim 1, wherein the first antenna element receives the first signal earliest amongst the plurality of antenna elements, and the second antenna element receives the first signal last amongst the plurality of antenna elements.

12. The wireless communication method of claim 8, wherein the first antenna element receives the first signal earliest amongst the plurality of antenna elements, and the second antenna element receives the first signal last amongst the plurality of antenna elements.

* * * * *